United States Patent [19]

Borg et al.

[11] Patent Number: 4,635,275
[45] Date of Patent: Jan. 6, 1987

[54] METHOD AND APPARATUS FOR DETECTING SYNCHRONOUS OR ASYNCHRONOUS DATA TRANSMISSION

[75] Inventors: Kevin E. Borg; Craig E. Forman, both of Indianapolis, Ind.

[73] Assignee: AT&T Technologies, Inc., Murray Hill, N.J.

[21] Appl. No.: 623,754

[22] Filed: Jun. 22, 1984

[51] Int. Cl.⁴ ............................................. H04L 7/00
[52] U.S. Cl. ........................................ 375/8; 455/70; 379/93
[58] Field of Search .................. 375/8, 111, 114, 116; 455/69, 70; 340/825.2, 825.44, 825.57; 370/111; 179/2 DP

[56] References Cited

U.S. PATENT DOCUMENTS

| | | | |
|---|---|---|---|
| 3,139,607 | 6/1964 | Grondin | 375/111 |
| 3,648,247 | 3/1972 | Frey, Jr. et al. | 375/116 |
| 3,801,956 | 4/1974 | Braun et al. | 375/116 |
| 4,001,504 | 1/1977 | Hendrickson | 375/114 |
| 4,022,973 | 5/1977 | Stackhouse et al. | 375/114 |
| 4,065,639 | 12/1977 | Suzuki et al. | 375/116 |
| 4,161,719 | 7/1979 | Parikh et al. | 375/114 |
| 4,181,909 | 1/1980 | Pyeatte et al. | 179/2 DP |
| 4,215,243 | 7/1980 | Maxwell | 179/2 DP |
| 4,356,566 | 10/1982 | Wada et al. | 375/116 |
| 4,409,684 | 10/1983 | Pooch et al. | 375/116 |
| 4,425,664 | 1/1984 | Sherman et al. | 375/8 |

OTHER PUBLICATIONS

"AMI 6800 Microcomputer Systems", (6800; 6820), *IC Master*, 1977, pp. 893, 894, 919–924.

Primary Examiner—Benedict V. Safourek
Assistant Examiner—Raymond C. Glenny
Attorney, Agent, or Firm—Samuel R. Williamson

[57] ABSTRACT

A data terminal suitable for home use and having the ability to communicate in both bit synchronous and character asynchronous formats is provided. When a user places a call to a database, the terminal automatically detects whether the database is operating in the bit synchronous or character asynchronous format by examining the received signal for a specific character stream. In response to the presence or absence of this character stream, the terminal automatically configures its receiver and transmitter to communicate in the desired format. This frees the user from the task of modifying a synchronous/asynchronous setup parameter each time a different database is accessed.

16 Claims, 4 Drawing Figures

METHOD AND APPARATUS FOR DETECTING SYNCHRONOUS OR ASYNCHRONOUS DATA TRANSMISSION

TECHNICAL FIELD

This invention relates to a method and apparatus for detecting data transmission and more particularly to a method and apparatus for determining whether the data is in a bit synchronous or a character asynchronous format.

BACKGROUND OF THE INVENTION

With the advent of computers in homes and businesses, there has been a proliferation of various database to be utilized therewith. At the present time each database, whether it contains information concerning news, science or business etc., will transmit the data in either a bit synchronous or character asynchronous format. In a synchronous data transmission, each character consists of either 5, 6, 7 or 8 information bits depending upon the code structure. There are no start and stop bits. Rather, character timing is derived through synchronizing characters at the beginning of each message or block of data. And an asynchronous data transmission is one wherein each character also consist of either 5, 6, 7 or 8 information bits, depending upon the code structure. These information bits are preceded by a start bit (zero condition) and followed by one or more stop bits (one condition) to synchronize a receiver with a transmitter for receipt of each character. A parity bit is sometimes included to detect errors.

Communication with a database is usually obtained through use of a data terminal. Heretofore, these terminals were manually reconfigured as appropriate each time a new database was called by the user who was knowledgeable as to whether the data transmission was in a bit synchronous or a character asynchronous mode. Often times today a user of a terminal is not familiar with the various ways of reconfiguring a terminal, and may not be familiar with the transmission format of the database. This is true since a large number of the users of terminals are now found in areas that are not technical or scientific in nature. Thus, it is important that the terminals be user friendly, i.e., easy to use by people who are not familiar with how terminals receive and transmit data.

Accordingly, it is desirable for a terminal to automatically determine whether the data being received is in a character asynchronous or bit synchronous format. It is also desirable for the terminal to be able to automatically adapt itself to the appropriate mode of operation. A terminal capable of these operations is easier to use in interfacing with new and different databases wherein the format of the data transmission is not readily known. An example of a database employing the first type of transmission is the Source, a home-based personel computer service of Reader's Digest ®, which employs a character asynchronous format for its data transmission. An example of the second type of database is that provided by Viewdata Corporation of America's Viewtron ® service. The database employs a bit synchronous format for its data transmission.

As additional databases with unknown formats of transmission become accessible from a terminal, the importance of automatically determining the format of transmission increases.

SUMMARY OF THE INVENTION

In accordance with the present invention, a data terminal arrangement automatically detects if a called database is operating in the bit synchronous or character asynchronous format for transmitting data. The terminal arrangement also automatically configures its receiver and transmitter to communicate in the desired format. Operationally controlled by a communications processor, the receiver starts out in the character asynchronous format and searches for a specific character stream upon the communication link being established. This stream represents a series of flag bytes that correspond to the bit synchronous format. If a predetermined number of flag bytes is detected, the terminal arrangement then configures its receiver and transmitter to communicate in the bit synchronous format. If the predetermined number of flag bytes is not detected then the terminal arrangement keeps the receiver and transmitter configured in the character asynchronous format.

This arrangement is achieved through the use of an adaptable modem along with the communications processor. The modem provides both receive and transmit clocking signals to the processor and thereby allows both data transmission and data reception to be linked to the timing established by a particular database. The clocking signals also appropriately trigger interrupt inputs on the processor so that the data transmission is processed without delay. Implementable on existing data terminals, the arrangement provides an inexpensive alternative to manual adjustment of these terminals.

BRIEF DESCRIPTION OF THE DRAWINGS

The invention will be more fully comprehended from the following detailed description and the accompanying drawing in which.

DETAILED DESCRIPTION

Figure 1:
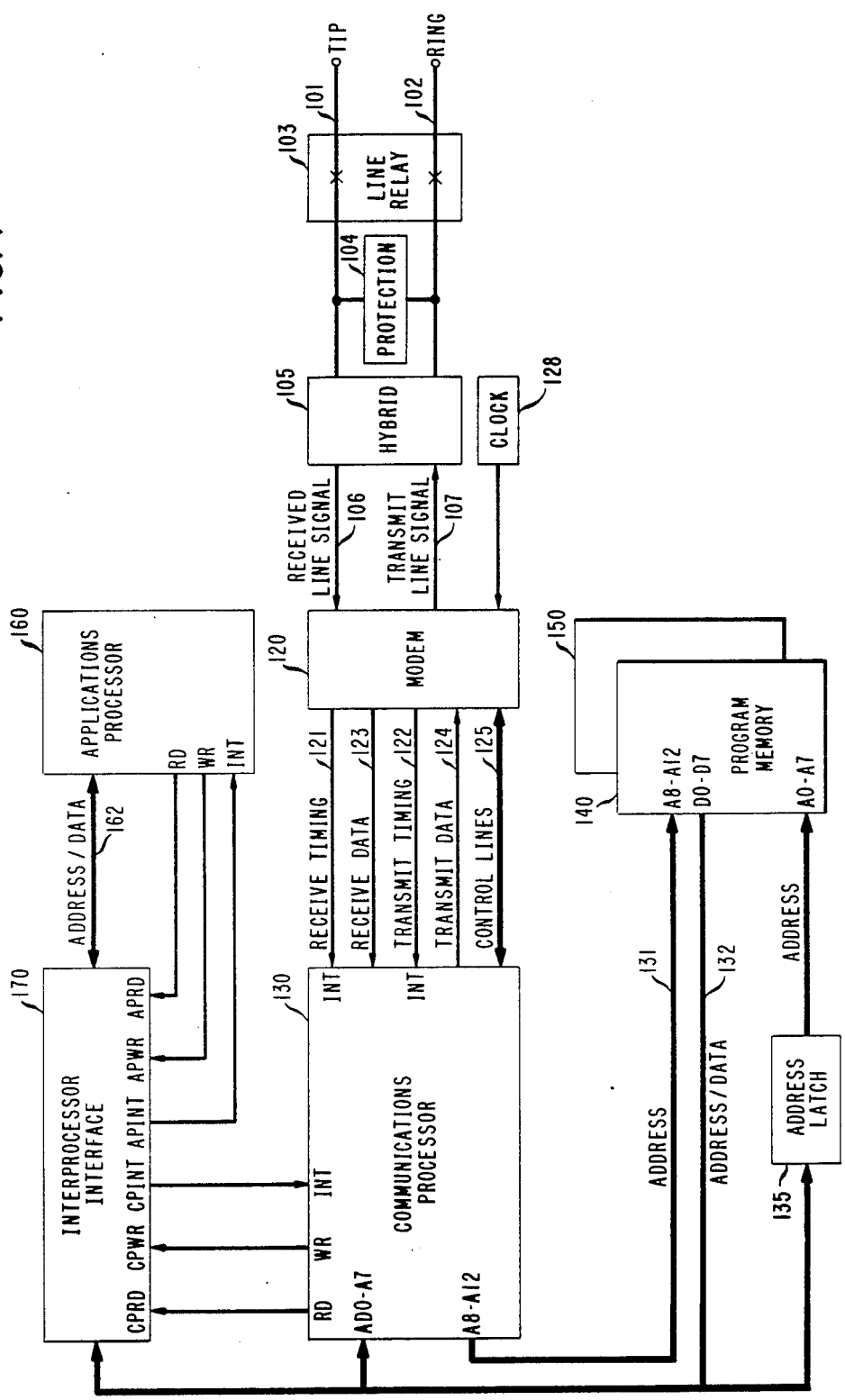
FIG. 1 is a block diagram showing the major functional components of an arrangement for detecting bit synchronous and character asynchronous data transmissions, and their general interconnection with each other in accordance with the present invention.

In accordance with the invention, a data terminal arrangement schematically depicted in FIG. 1 is suitable for displaying textual and graphic information in a home environment. This terminal arrangement is automatically configurable in either a bit synchronous or a character asynchronous format and allows a terminal user to receive and transmit data over standard telephone lines. The terminal arrangement automatically detects if a called database is operating in the bit synchronous or character asynchronous mode and then automatically configures its receiver and transmitter to communicate in the desired format.

In general, implementing the terminal arrangement with an automatic synchronous/asynchronous detector is facilitated by requiring that the arrangement starts out configured in a default mode (either bit synchronous or character asynchronous mode could be assumed). A given number of the first few characters received from a called database are monitored for some identifiable sequence. Receiving these characters in a given time, or having the given time lapse without the characters being received, determines the mode of operation thereby, and the receiver and transmitter are set up accordingly.

Operation of the arrangement thus centers around receiving a unique, identifiable sequence of characters sent out by the called database each time a new connection is established. Such an identifiable sequence of characters is provided by a database operating in the bit synchronous format using the high level data link control (HDLC) protocol such as the Viewtron ® system operated by Viewdata Corporation of America. Such a database will always send out a minimum number of flag characters before connection is established. Additional information is available from AT&T Technical Reference Operations Systems Network Communications Protocol Specification BX.25, issue 3, dated June 9, 1982, publication No. 54001 and International Standards Organization publications 3309 and 4355.

The received data is monitored by the terminal arrangement and the flag characters detected by a synchronous/asynchronous detector configured initially to operate in the character asynchronous mode. Thus, the first few characters are received asynchronously and are compared to flag characters. If a match is found, proper operation is assumed to be in the bit synchronous format, and the receiver and transmitter are configured in the bit synchronous mode. Otherwise, the character asynchronous format is assumed and the receiver and transmitter remain configured in the character asynchronous format.

Operation is also possible with a synchronous/asynchronous detector in a terminal arrangement configured with the bit synchronous mode as the default mode. When the called database is a character asynchronous database, the first few characters transmitted are usually some type of login prompt. With the terminal receiver starting up in the bit synchronous format, these first few characters are checked for flags and no match is found. The terminal receiver then switches to the character asynchronous mode. The first few characters received as the login prompt are held in a buffer until a determination of the communication format is made. At that time, if asynchronous operation is selected, the characters in the buffer (i.e., the login prompt) can be sent to a video processor in the terminal arrangement for displaying on a screen or other output display means of the terminal arrangement.

As earlier indicated, a steady stream of flag bytes are received by the terminal arrangement when establishing communications with a bit synchronous database. These flag bytes consist of a stream of six ones surrounded by a zero on each side. If the terminal receiver is operating in the character asynchronous mode, it inserts stop bits as necessary to guarantee that the customer receives properly framed characters with start and stop bits. In this system, properly framed transmissions consist of 10 bits; a start bit (logic 0), 8 data bits, and a stop bit (logic 1). The least significant bit is always transmitted first.

Referring now in detail to FIG. 1, there is shown a block diagram of the arrangement in accordance with the present invention. Known in the art are a line relay 103, a surge protection network 104 and a hybrid 105 which are shown to illustrate how the arrangement is operably connected to a central office over standard telephone tip and ring lines 101 and 102. Line relay 103 provides a means for locally connecting and disconnecting the arrangement as desired. The surge protection network 104 protects the arrangement against high voltage surges that might be inadvertently impressed on the telephone tip and ring line. And the hybrid 105 converts the balanced tip-ring signal from the tip and ring lines 101 and 102 into both a receive line signal and transmit line signal on lines 106 and 107 respectively.

The transmit and receive signals connect to a modem 120 that is comparable in general operation to a data set 212A presently available from AT&T Technologies, Incorporated. Modem 120, differs in specific operation, however, since it is arranged to couple data to and from a communications processor 130 with timing information which informs this processor 130 when the data is valid. Both receive and transmit timing signals are provided to the communications processor 130 by the modem 120 so that the data transmission and reception are synchronized to the timing established by the database. Timing signals for operation of the modem 120 are also provided from a reference clock 128. Receive timing signal on line 121 and transmit timing signal on line 122 both drive interrupt inputs on the communications processor 130 so that the data bits can be processed without delay. And a number of control lines 125 run between the communications processor 130 and the modem 120 to accomplish such miscellaneous tasks as receive signal detection, analog loopback, and link establishment.

When the modem 120 receives a data bit from the telephone line, it makes this data bit available on line 123 to the communications processor 130 on a transition of the received timing signal on line 121. Similarly, the communications processor 130 when it has a transmit data bit to send over the telephone line, makes the transmit data bit available on line 124 when it sees a transition of the transmit timing signal on line 122 from the modem 120.

When an interrupt occurs, the communications processor 130 terminates a program currently being executed and executes either an interrupt service routine for the received data bit or an interrupt service routine for the transmit data bit, depending on whether the interrupt is occurring on the received timing signal line 121 or the transmit timing signal line 122. In the operation of these interrupt service routines, the communications processor 130 either reads a data bit from the modem 120 or makes a data bit available to the modem 120 as appropriate. A single-chip microcomputer suitable for use as the communications processor 130 is available from Intel Corporation as part number 8051 and can be used with the proper programming.

The communications processor in the present arrangement has internal memory but also uses external program memory contained in a read only memory (ROM) 140. External storage is also provided in a random access memory (RAM) 150. Both the ROM 140 and the RAM 150 receive address information from the communications processor 130 over the 8 bit address bus 131 and also interface to the communications processor over the 8 bit address/data bus 132. An address latch 135 provides temporary storage of the address information from the communications processor 130 provided over the address/data bus 135 since this bus is multiplexed with information for other circuitry being present thereon at different times. Some of the memory in RAM 150 is used as a receive data buffer for storing the data bits received from the database.

The communications processor 130 and the above associated circuitry may be considered peripheral to a data terminal and may therefore interface to another processor or computer. In the present arrangement, the communications processor 130 is shown associated with an applications processor 160 which serves as the master or controlling processor and is suitably programmed for controlling a data terminal or the like.

This application processor 160 could be part of a stand alone computer such as a personal computer or a microprocessor such as one available from Intel Corporation as part number 8088. In addition to its other duties, the application processor has in the present arrangement the function of controlling the user interface which includes input from a keyboard and output in the form of a color video display on a cathode ray tube (CRT).

The applications processor 160 interfaces to the communications processor 130 through an interprocessor interface 170. This interprocessor interface has a port for the address/data buses 132 and 162 from the communications processor 130 and applications processor 160 respectively. Each processor provides read and write information to the interprocessor interface 170 and each processor receives an interrupt as appropriate from the interprocessor interface 170. Thus when one processor tries to access the other by reading or writing, the accessed processor receives an interrupt via the interprocessor interface 170 informing it that a transaction is to take place. The interrupted processor stops executing what ever program is then being worked on and either provides the data that is requested or accepts the data that is sent to it.

In the operation of the arrangement in the asynchronous mode with a nominal speed of 1200 baud, the modem 120 allows a user to receive data at speeds ranging from 1170 to 1212 bits per second by using the RAM 150 for buffer storage of the received data. If, for example, a remote database is transmitting data slightly faster than 1200 baud, a transmit buffer associated with a sending modem could occasionally delete a stop bit from the characters transmitted by the database. Software in the Communications processor 130 compensates for these missing stop bits by emulating a character-asynchronous receiver with missing stop bit insertion. That is, when the stop bit position is examined and is found to be a space (0) level rather than a mark (1) level, that bit is interpreted as the start bit of a new character.

Figure 2:
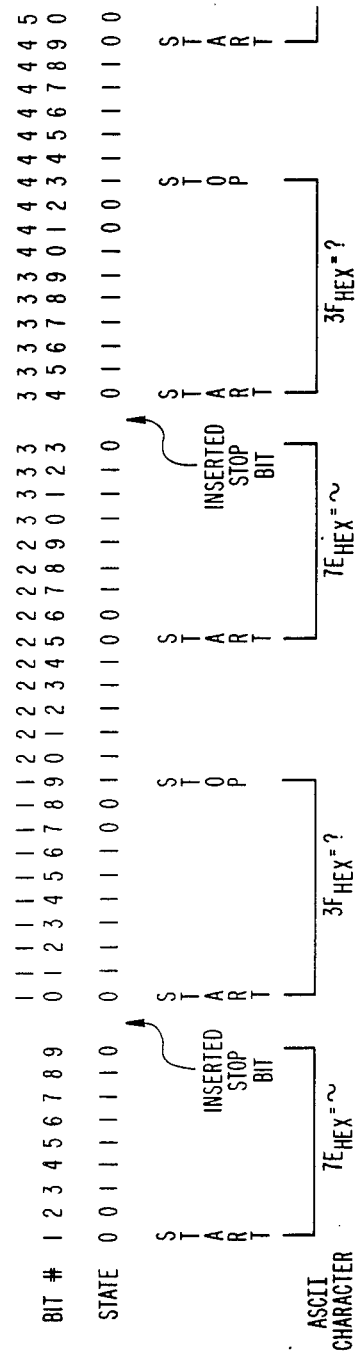
FIGS. 2 and 3 are each representations of a sample flag byte transmission.
Figure 3:
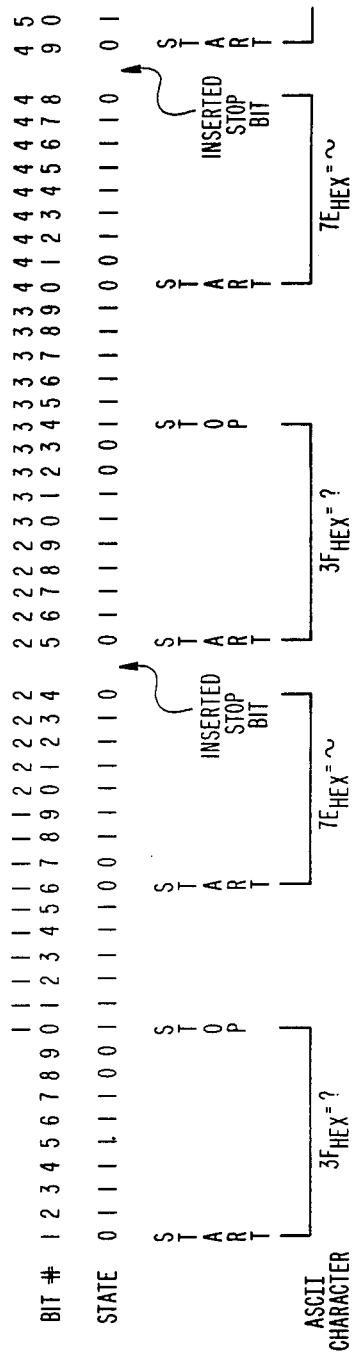

Referring now to FIG. 2 and FIG. 3, there are two different examples showing how the character asynchronous receiver interprets a received flag byte. The first example shown in FIG. 2 assumes that the first two bits received are 0,0, and the second example shown in FIG. 3 assumes that the first two bits received are either 1,1 or 0,1 or 1,0. Receiving different initial bits takes into account the possibility that the receiver may begin operation at an arbitrary point within the flag byte. The incoming bits are labeled in consecutive order from 1 to 50 with the bits that are interpreted as start and stop bits also being labeled. Also shown are the locations where stop bits are inserted by the receiver, as well as the ASCII characters and hex values received by the terminal.

As illustrated in FIG. 2, the received transmission begins with 0,0. Bit 1 is a zero and is interpreted as a start bit. The receiver counts out to bit 10, where it expects to see a stop bit (1). However, bit 10 is received as a zero, so a stop bit is inserted between bits 9 and 10. Bit 10 is then interpreted as the start bit of a new character. The receiver again counts to the 10th received bit, and finds a 1 at bit position 19. This is interpreted as a stop bit in the correct position. The receiver then looks for the next start bit (0), and finds it at bit 25. After counting another 10 bits, it expects to see a stop bit (1), but instead finds a 0 at bit position 34. The receiver then inserts a stop bit between bits 33 and 34. Bit 34 is then interpreted as the start bit of a new character. That character has its stop bit at bit position 43. The process goes on as long as flag bytes are being received, yielding the ASCII characters tilde (hex 7E) and question mark (hex 3F). Thus, the received string becomes ~?~?~?. . . .

As illustrated in FIG. 3, the received transmission begins with either a 1,1 0,1 or 1,0. In either case, the first zero is interpreted as the start bit of the first character. The receiver expects to see a stop bit at bit position 10, and indeed finds a 1 there. The next character begins with bit 16, a start bit (0). The receiver expects to see a stop bit (1) at bit position 25, but instead finds a (0) there. It then inserts a stop bit between bits 24 and 25 and interprets bit 25 as the start bit of a new character. The next stop bit is expected and is correctly received at bit position 34. The next character begins with a start bit at bit positions 40, and the receiver inserts a stop bit between bits 48 and 49. The process again yields the ASCII characters question mark (hex 3F) and tilde (hex 7E) in the order ?~?~ . . . .

It is seen that both examples of received transmissions shown in FIGS. 2 and 3 yield identical character strings, differing only by the starting character. The first few received characters are monitored for detection of this string, and if found, bit synchronous operation is selected for the duration of the terminal session.

Figure 4:
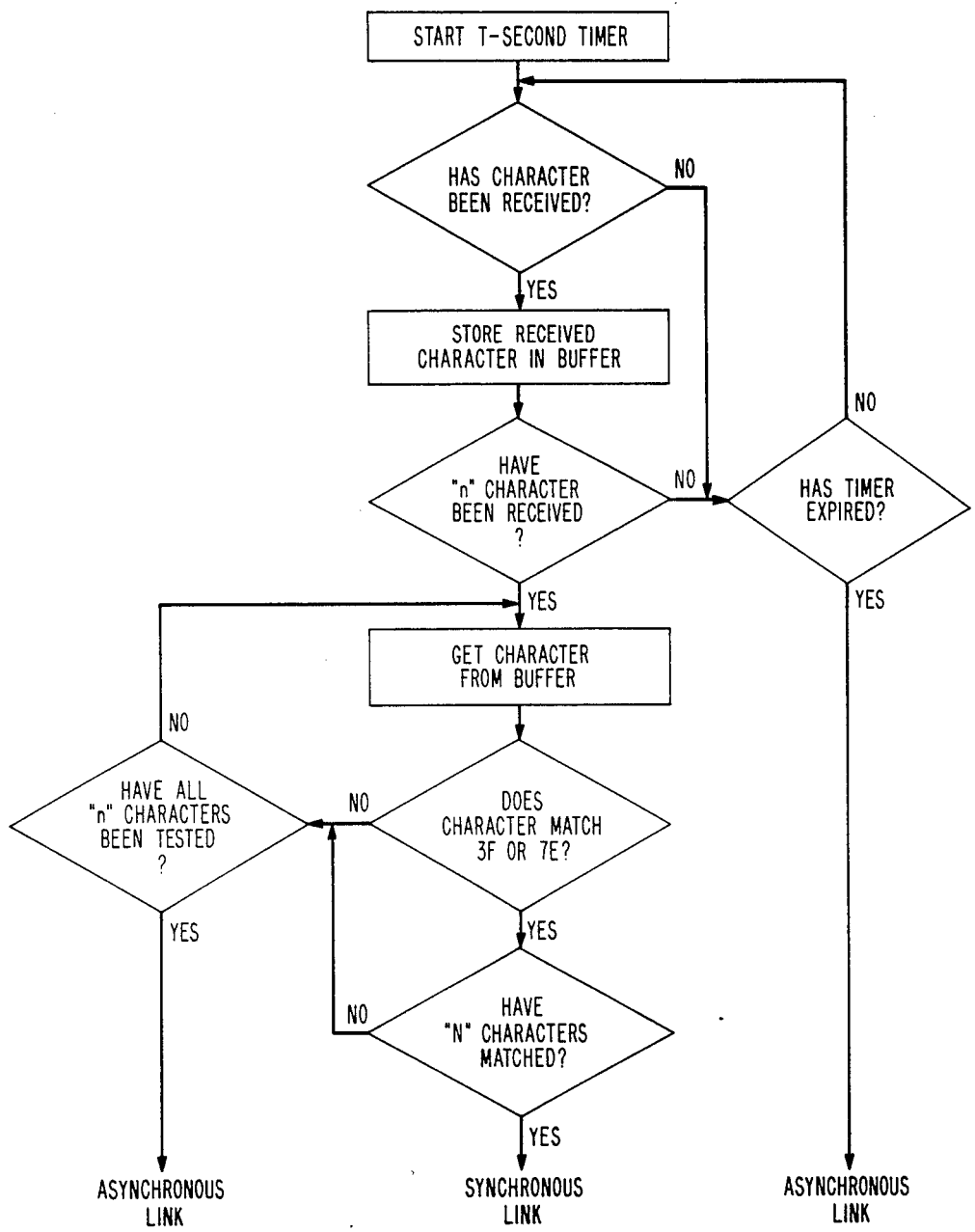
FIG. 4 is a flow chart representation of the manner for determining the format of data transmission in accordance with this invention.

Referring to FIG. 4 there is a flowchart representation of the control functions performed by the communication processor 130 and associated circuitry of FIG. 1 in determining the format of the received data transmission. The sequence in which these functions are performed is indicated by the flowchart and shown in sufficient detail to permit one skilled in the art to duplicate the circuitry of FIG. 1 either by programming a microprocessor or by special purpose logic circuitry. Whereas the flowchart shows specified characters for use in this application, it is readily apparent that it would be a simple matter to change to other characters for this same application.

In order to minimize the effect of noise that might be present on a telephone line and yet keep the format determining software as simple as possible, the communications processor 130 is arranged to check for a minimum number "n" of the first characters received, which is set at 40 in this arrangement, for either the 3F or 7E value, and require 75% of these characters "N" to match one of the two values.

The format detection is achieved by initially configuring the receiver into the character-asynchronous mode in response to the communications processor 130 and waiting until either the 40 characters have been received or until a given period of time such as 5 seconds has elapsed from establishment of the modem connection.

If the minimum number of characters necessary are received before the time limit expires, the receive buffer is searched for either of the characters from the characteristic sequence 3F/7E described earlier herein. If at least 30 of the 40 characters match either 3F or 7E, the called database computer is assumed to be operating in the synchronous mode. The receiver and transmitter are switched to operate in the bit synchronous mode, the receive and transmit buffers are reconfigured for synchronous operation, and the synchronous link setup is begun. When the link setup is complete, the communications processor 130 informs the applications processor 160 that the database computer is operating in the synchronous mode.

If an insufficient number of either of the two characters are found, or if the time limit expires before the minimum number of characters is received, the link is assumed to be asynchronous. The receiver, already in the asynchronous mode of operation, is left running and any characters received are passed to the applications processor 160. The communications processor 130 also informs the applications processor 160 that the database computer is operating in the asynchronous mode.

Many variations of the basic arrangement are possible and may obviously be implemented by those skilled in the art without departing from the spirit and scope of the invention. For example in the present arrangement, the search for flags is arranged by looking at the first character received and searching forward in the receive buffer. Once a synchronous transmitter begins sending flags, it is likely to continue for some minimum time before sending its first information packet. With this minimum time as a design consideration, an alternative embodiment may be arranged to start the search at the last flag character received and search backward. This would delay the testing of the first characters received (those most likely to be the result of received noise) for last, increasing the probability that they need never be checked. If such a minimum time could be assured from all databases, however, a decrease in the amount of time needed to determine the link mode is possible.

What is claimed is:

1. An arrangement for detecting both a synchronous and asynchronous format of initially received data from an external source for establishing initial communications with the external source, the arrangement comprising:
   data processing means for controlling the operation of a data transmission channel in response to receipt of a particular sequence of data elements in the initially received data, the data processing means automatically configuring data for transmission over the transmission channel to the external source in a selected format upon receipt of a predetermined number of the particular sequence of data elements.

2. The arrangement of claim 1 further comprising memory means for storing an accumulation of the particular sequence of received data elements up to the predetermined number, and comparison means for comparing the sequence of received data elements with a previously selected sequence of data elements, the matching of the stored sequence of data elements with the previously selected data elements reflecting the particular format of data being received from the external source.

3. The arrangement of claim 2 wherein the data for transmission is initially configured in the asynchronous format, the data processing means configuring data for transmission in the synchronous format in response to receipt of the predetermined number of the particular sequence of data elements.

4. The arrangement of claim 3 wherein the data processing means upon initially receiving data from the external source retains data for transmission in the configuration of the asynchronous format in the absence of receiving the predetermined number of the particular sequence of data elements in a predetermined time period.

5. The arrangement of claim 4 further comprising demodulation means for receiving data from the external source and modulation means for transmitting data to the external source, the data processing means being operatively responsive both to a receive timing interrupt signal from the demodulation means for controlling the receipt of data by the data processing means and a transmit timing interrupt signal from the modulation means for controlling the transmission of data by the data processing means.

6. The arrangement of claim 5 wherein the memory means further comprises temporary memory means for storing the particular sequence of received data elements and program memory means for providing the previously selected sequence of data elements, the comparison means comparing the accumulation of the particular sequence of data elements in the temporary memory means with the previously selected sequence of data elements in the program memory means.

7. The arrangement of claim 6 wherein the data processing means comprises a communications processor, the communications processor respectively providing to and receiving from an applications processor both the data received by the demodulation means and data for transmission by the modulation means, the applications processor providing a controlling means for processing and displaying locally entered and externally received data.

8. The arrangement of claim 6 wherein the particular sequence of received data elements and previously selected sequence of data elements both comprise in alternating order ASCII representations of tilde and question mark characters.

9. The arrangement of claim 8 wherein the predetermined number of the particular sequence of data elements comprise 40 characters.

10. A method for detecting both a synchronous and asynchronous format of initially received data from an external source for establishing initial communications with the external source, the method comprising the steps of:
    controlling the operation of a data transmission channel in response to receipt of a particular sequence of data elements in the initially received data; and
    configuring data for transmission over the transmission channel to the external source in a selected format upon receipt of a predetermined number of the particular sequence of data elements.

11. A method for detecting a synchronous or asynchronous format of data received in accordance with claim 10 and further comprising the steps of:
    storing an accumulation of the particular sequence of received data elements up to the predetermined number; and
    comparing the sequence of stored data elements with a previously selected sequence of data elements, the matching of the sequence of stored data elements with the previously selected data elements reflecting the particular format of data being received from the external source.

12. A method for detecting a synchronous or asynchronous format of data received in accordance with claim 11 and further comprising the steps of:
   initially configuring the data for transmission in the asynchronous format; and
   subsequently configuring the data for transmission in the synchronous format in response to receipt of the predetermined number of the particular sequence of data elements.

13. A method for detecting a synchronous or asynchronous format of data received in accordance with claim 12 further comprising the step of:
   retaining data for transmission and configured in the asynchronous format in the absence of receiving the predetermined number of the particular sequence of data elements from initially received data in a predetermined time period.

14. A method for detecting a synchronous or asynchronous format of data received from an external source in accordance with claim 13, the method further comprising the step of:
   providing to and receiving from an applications processor both the data received from the external source and data for transmission to the external source, the applications processor providing a controlling means for processing and displaying locally entered and externally received data.

15. A method for detecting a synchronous or asynchronous format of data received from an external source in accordance with claim 14 wherein the particular sequence of received data elements and previously selected sequence of data elements both comprise in alternating order ASCII representations of tilde and question mark characters.

16. A method for detecting a synchronous or asynchronous format of data received from an external source in accordance with claim 15 wherein the predetermined number of the particular sequence of data elements comprise 40 characters.

* * * * *